United States Patent [19]

Andre

[11] Patent Number: 4,541,733
[45] Date of Patent: Sep. 17, 1985

[54] FITTING FOR A COOKING UTENSIL, PARTICULARLY A STEAM PRESSURE COOKING PAN

[75] Inventor: Wolfram K. Andre, Aichwald, Fed. Rep. of Germany

[73] Assignee: Kurt Wolf & Co. KG, Fed. Rep. of Germany

[21] Appl. No.: 539,684

[22] Filed: Oct. 6, 1983

[30] Foreign Application Priority Data

Oct. 20, 1982 [DE]  Fed. Rep. of Germany ....... 3238769

[51] Int. Cl.[4] .................. G01K 1/14; A47J 27/00
[52] U.S. Cl. ........................ 374/149; 99/343; 126/388
[58] Field of Search .............. 374/149, 141; 99/343; 126/388

[56] References Cited

U.S. PATENT DOCUMENTS

| | | | |
|---|---|---|---|
| 1,455,909 | 5/1923 | Ditton | 374/141 |
| 1,548,489 | 8/1925 | Sears | 374/141 |
| 1,863,918 | 6/1932 | Bremer | 374/141 |
| 1,919,560 | 7/1933 | Knapp | 374/141 X |
| 2,219,949 | 10/1940 | Childs | 99/343 |
| 2,440,472 | 4/1948 | Horner et al. | 374/141 X |
| 2,750,916 | 6/1956 | Hanington | 99/343 X |
| 3,167,733 | 1/1965 | DiNoia | 374/185 X |
| 3,274,832 | 9/1966 | Hamilton | 374/171 |
| 3,613,454 | 3/1970 | McFadin | 374/185 |
| 3,668,372 | 6/1973 | Russell | 374/141 X |
| 3,713,339 | 1/1973 | Medlar | 374/141 X |
| 3,736,861 | 6/1973 | Kroyer et al. | 99/343 |
| 4,206,648 | 6/1980 | Tuska et al. | 374/171 |
| 4,464,066 | 8/1974 | Cappucculli | 374/141 |

*Primary Examiner*—Daniel M. Yasich
*Attorney, Agent, or Firm*—Thomas W. Speckman

[57] ABSTRACT

The invention concerns a fitting for a cooking vessel comprising a cooking pot and a cover, especially a steam pressure cooker, with a temperature sensor attached to the cooking vessel, the temperature sensor emitting an electrical signal corresponding to the temperature inside the cooking vessel. In order to precisely detect the temperature of water contents during the heating phase, and in order to be able to use it for indicators, control, and regulation, the temperature sensor is attached to a measuring point in a heat-conducting contact to the external side of the cooking pot in the transition area between the pot bottom and the pot wall, at which point the temperature difference between the temperature of the water contents and the external temperature at the measuring point during the heating process is approximately nil.

13 Claims, 3 Drawing Figures

FITTING FOR A COOKING UTENSIL, PARTICULARLY A STEAM PRESSURE COOKING PAN

BACKGROUND OF THE INVENTION

1. Field of the Invention

This invention concerns a fitting for a cooking vessel comprising a cooking pot and a cover, especially a steam pressure cooker, with a temperature sensor attached to the cooking vessel, which emits an electrical signal corresponding to the temperature inside the cooking vessel.

2. Description of the Prior Art

A fitting of this general type is known from German Patent Publication No. DE-OS 29 32 039, and is used for controlling cooking and fermentation times. The temperature sensor is attached to the area of the excess pressure valve located in the cover and controls a timing circuit, which, in accordance with a preselectable time, releases an indicator upon reaching the maximum temperature within the cooking vessel, and which indicates the end of the cooking or fermentation times. An indicator device is attached to the excess pressure valve, which indicates the build-up of pressure inside the cooking vessel.

In the known device, the temperature sensor detects a temperature, which, in the heating phase of the cooking vessel, diverges very sharply from the temperature of the contained water. In a heated condition, the temperature in the cooking pot is detected only approximately accurately. As a result, the control of the timing circuit gives no consideration to the heating phase. The mechanical indication of the steam pressure phase is not only inexact, but also susceptible to breakdown. If the water contained in the cooking vessel reaches the critical temperature of 100° C., then the mechanical indicator device does not respond. Opening a cooking vessel in this phase, however, is already dangerous.

SUMMARY OF THE INVENTION

An object of the invention is to create a device of the type mentioned above, in which the reaching of critical temperature in the contained water, even in the heating phase, is detected very precisely, and which can be used for an exact indication of this condition, as well as for the precise control of the cooking or fermentation times.

According to the invention, this object is achieved in the following manner: the temperature sensor is attached to the exterior side of the cooking pot in the transition region between the pot bottom and the pot wall, in a heat-conductive contact at a measuring point at which the temperature difference between the temperature of the water contents and the exterior temperature at the measuring point is approximately zero during the heating process.

In this embodiment of the device, a temperature measurement during the heating phase is made possible without contact with the internal space of the cooking vessel, so that the reaching of the critical temperature can be indicated very exactly. The mechanical device, which is susceptible to failure, can be replaced, so that an erroneous indication of the critical condition is eliminated. The exact temperature detection in the heating phase also offers advantages for the control of a timing circuit for cooking and fermentation times, and for the control of the heat level, especially at higher levels. The adjustment of the maximum temperature is facilitated, and the energy requirement for the cooking and fermentation process can be optimized.

A connection, which conducts heat very well, between the cooking pot and the temperature sensor, is attained by means of an embodiment, by which the temperature sensor is connected directly with the exterior surface of the cooking vessel; either welded or joined, as one prefers.

The same effect can be attained by another embodiment, in which the temperature sensor is held in a mounting plate, enclosed and in heat-conducting contact; this is firmly held by means of a nut and a lock washer to a thread and bolt connected to the cooking pot.

In the usual embodiment of the cooking vessel, the measuring point for the temperature sensor is joined to the pot bottom at the beginning of the convex transition region facing the pot wall. This measuring point permits a simple mounting of the temperature sensor, but necessarily lies, however, in an area where it is ensured, without extensive measurements, that the temperature difference between the temperature of the water contents and the external temperature at this measuring point is very slight.

In a further embodiment, it is provided that the temperature sensor, which is attached in a heat-conducting manner to the cooking pot, is covered by means of an attachment of the handle which is joined to the cooking pot. In the mounting of the temperature sensor by means of a threaded bolt fixed to the cooking pot, the attachment of the handle can also be fixed with the nut.

The electrical connection of the temperature sensor and electrical contacts with a computing device is effected by means of an embodiment in which the attachment facing the pot wall of the cooking pot has an accommodation for connection of a cable connected to the temperature sensor; and in which electrical contacts are provided in the handle of the cooking pot for a computing device fixed detachably to the handle, to which the electrical cable is connected.

In one embodiment, the computing device can be inserted into the hollow-shaped handle of the cooking pot or of the cover.

The connection of the computing device can, according to one embodiment, be so executed that the electrical contacts are formed as plug contacts, and that the computing device is provided with counter-plug elements fitting these. The plug connection can, in addition to the electrical, also take over the mechanical contact.

An electrical signal proportionate to the temperature in the temperature range of interest is obtained, in one embodiment, in this manner: an NTC or PTC resistor is used as a temperature sensor; this, in the temperature range from about 95° C. to 120° C., exhibits an adequately linear resistance-temperature characteristic curve, or one which may be linearized by known switching measures in this range.

It is provided, in accordance with one embodiment, that the computing device emits a first indicator signal up until the reaching of a preselected critical temperature, then a warning is given which positively indicates to the user the reaching of the critical temperature, and the dangers connected with the opening of the cooking vessel.

It is provided, in accordance with a further embodiment, that the computing device, during the exceeding of the critical temperature and up to the preselected maximum temperature, emits in addition a second indicator signal; and in which the computing device, upon reaching the maximum temperature, turns off the first and second indicator signal, and turns on a third signal, then, with the first and second indicator signal it is indicated that the work temperature necessary for cooking or fermentation is present, while a summons to the reduction of the heat level is given with the appearance of the third indicator signal.

BRIEF DESCRIPTION OF THE DRAWING

The invention is further elucidated with the examples depicted in the drawings wherein.

DESCRIPTION OF PREFERRED EMBODIMENTS

Figure 1:
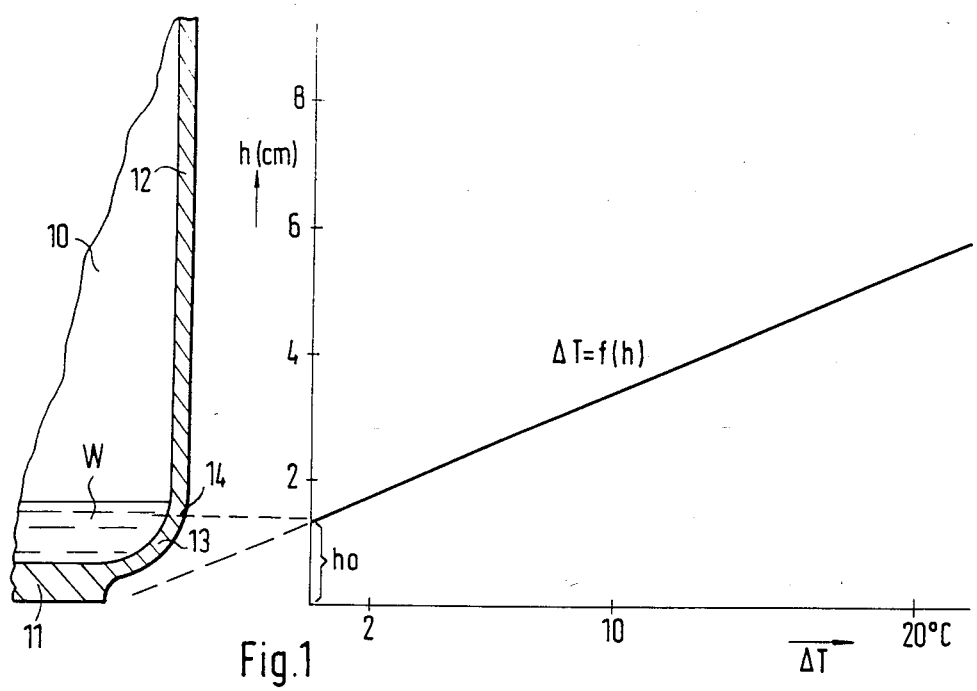
FIG. 1 shows a diagram for determining an optimal measuring point for the temperature sensor.

The diagram $\Delta T = f(h)$ in FIG. 1 applies to the heating phase of the cooking vessel. In this, cooking pot (10) is closed, in the manner known, by means of a cover (not depicted), and bottom (11) of cooking pot (10) stands on the heating plate. Bottom (11), which is thicker in wall thickness, passes into pot wall (12) by means of convex transition region (13). The water contents W inside cooking pot (10) is used for the production of steam. As soon as the water contents W reaches a critical temperature of about 100° C., the formation of steam—and, connected with this—the build-up of pressure in initiated. Even at this point in time it is dangerous to open the cooking vessel. It is thus decisive that, during the heating phase, the reaching of the critical temperature in the water contents W is exactly detected, indicated, and used for controlling the cooking or fermentation time, or for regulating heat output.

The diagram, according to FIG. 1, shows that, at measuring point (14) during the heating phase, the temperature difference $\Delta T$ between the temperature Tw of the water contents W and the temperature Ta of the external surface of cooking pot (10) is approximately zero. The greater the distance h is from the lower surface of bottom (11), the greater is the temperature difference $\Delta T$. The distance ho determines the measuring point (14). The temperature difference $\Delta T$ increases also as the distance from measuring point (14) to the lower surface of bottom (11) decreases. If the temperature sensor at measuring point (14) is connected in a heat-conducting manner with the external surface of the cooking pot, then it is ensured that, during the heating phase, the temperature Tw of the water contents W is precisely determined.

In cooking pot (10), measuring point (14) lies at the beginning of transition region (13) to the pot bottom, which faces pot wall (12). The measuring point (14) can, in this embodiment of cooking pot (10) be selected without previous extensive measurements, without a large temperature difference having to be feared.

Figures 2, 3:
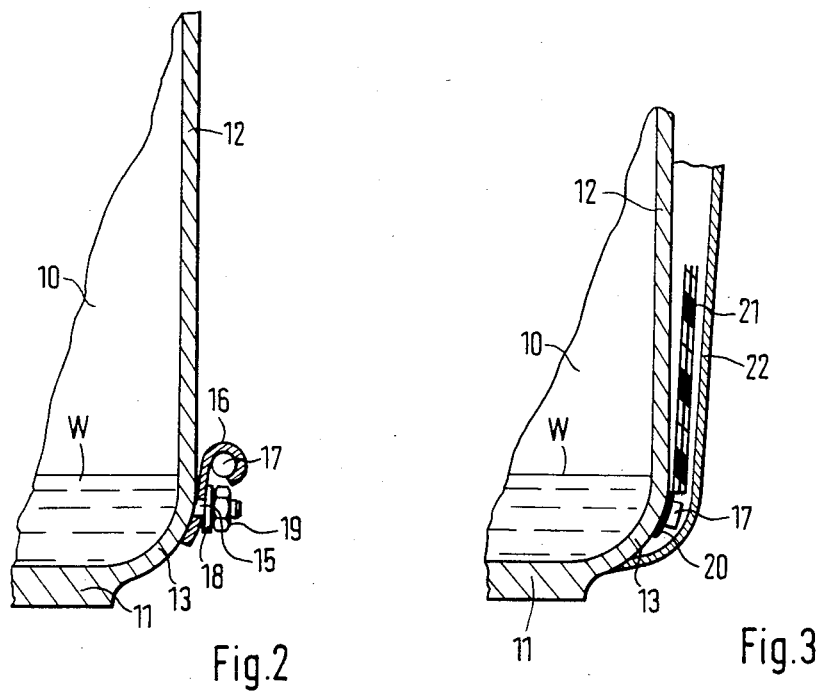
FIG. 2 shows a first embodiment for the placing of the temperature sensor on the exterior side of the cooking pot.
FIG. 3 shows a second embodiment for the placing of the temperature sensor on the external side of the cooking pot.

The cross-section according to FIG. 2 shows placing of temperature sensor (17) on the external surface of cooking pot (10). In the area of measuring point (14) a thread bolt (15) protrudes. Temperature sensor (17) is an NTC or PTC resistor which, in the temperature range from around 95° C. to around 120° C., exhibits a linear resistance-temperature characteristic curve. This NTC or PTC resistor is enclosed by mounting plate (16) in a heat-conducting manner. Mounting plate means (16) is bolted firmly to cooking pot (10), by means of nut (19) and lock washer (18), and a good, heat-conducting contact is thus produced.

As the cross section according to FIG. 3 shows, temperature sensor (17) can also be directly connected to the external surface of cooking pot (10). Layer means (20) indicates an adhering and welding connection. Any other attachment is possible. A good heat-conducting connection between cooking pot (10) and temperature sensor (17) is desired. Temperature sensor (17) is covered by means of attachment (22) of the handle which attaches to cooking pot (10). Attachment (22), which faces pot wall (12), thereby forms an accommodation for connection cable (21) of temperature sensor (17). Connection cable (21) leads, for example, to connection contacts in the handle, to which the computing device—which converts the changes of resistance of temperature sensor (17) into electrical signals, and which releases indicator, control, or regulator signals—is detachably connected. The handle can be hollow shaped, and contain the computing device. The connection contacts can also be shaped as plug contacts. The computing device is provided with counter-plug elements which are fitted to it, and can then be easily attached to the handle. The computing device can be easily removed in order to clean the cooking vessel. The plug connection can also be placed in the area of the handle connected to the cover. Then the connection cable of temperature sensor (17) is connected, by means of sliding contacts in the handle of cooking pot (10), to the handle of the cover, and thus lead to the connection contacts for the computing device.

If the temperature conditions in the cooking vessel should be indicated as easily recognizable, then one embodiment is distinguished by the fact that the computing device, up to the reaching of a preselected temperature of, for example, 100° C., emits in addition a second indicator signal; and in which, upon reaching this maximum temperature, the computing device turns off the first and the second indicator signal, and switches on a third indicator signal. If the indicator signals are given by means of a green, yellow, or red lamp, then the conditions are indicated, in the manner of a traffic light, according to the level of their danger. The control of the indicator lamps can also be varied.

I claim:

1. A cooking utensil comprising a cooking pot having a vertical wall and a base and a cover with water contents (W), with a temperature sensor attached to said cooking pot, which emits an electrical signal corresponding to the temperature inside said cooking utensil, characterized by having a temperature sensor (17) attached by means to the external surface of said cooking pot (10) at a point selected adjacent said wall at the beginning of the transition region (13) between the wall (12) and the base (11) of said pot by a heat-conducting connection to a measuring point (14), the temperature difference ($\Delta T$) between the temperature (Tw) of said water contents (W) and the temperature (Ta) of said external surface of said cooking pot (10) at said measuring point (14) is, during heating of said liquid contents until said contents reach a critical temperature of about 100° C., approximately zero.

2. A cooking utensil according to claim 1, characterized by said temperature sensor (17) being contained by a mounting plate (16), enclosed in a heat-conducting connection; said mounting plate (16) being firmly connected to a threaded bolt (15) connected to said cooking pot (10) at said measuring point (14) by means of a nut (19) and a lock washer (18).

3. A cooking utensil according to claim 2, characterized by said measuring point (14) being located at the beginning of said transition region (13) on said wall (12), said temperature sensor (17) fixed in a heat-conducting manner to said cooking pot (10) and covered by atachment portion (22), said attachment (22) facing said wall (12) of said cooking pot (10) having an accommodation means for a connection cable (21) connected to said temperature sensor (17).

4. A cooking utensil according to claim 3, characterized by an NTC-resistor being used as said temperature sensor (17), said resistor exhibiting a generally linear resistance-temperature characteristic curve in the temperature range of about 95° C. to 120° C.

5. A fitting for a cooking vessel according to claim 3, characterized by a PTC-resistor being used as said temperature sensor (17), said resistor exhibiting a generally linear resistance-temperature characteristic curve in the temperature range of about 95° C. to 120° C.

6. A cooking utensil according to claim 1, characterized by said temperature sensor (17) being fixed in a heat-conducting manner to said cooking pot (10) and being covered by attachment portion (22) of a handle attached to said cooking pot (10).

7. A cooking utensil according to claim 6, characterized by said attachment portion (22) facing said wall (12) of said cooking pot (10) and having an accommodation means for a connection cable (21) connected to said temperature sensor (17).

8. A cooking utensil according to claim 1, characterized by an NTC-resistor being used as said temperature sensor (17); said resistor exhibiting a generally linear resistance-temperature characteristic curve in the temperature range of about 95° C. to 120° C.

9. A cooking utensil according to claim 1, characterized by a PTC-resistor being used as said temperature sensor (17); said resistor exhibiting a generally linear resistance-temperature characteristic curve in the temperature range of about 95° C. to 120° C.

10. A cooking utensil according to claim 1, characterized by said temperature sensor (17) being connected to the exterior surface of said cooking vessel by an adhering and welding connection (20).

11. A cooking utensil according to claim 10, characterized by said measuring point (14) being located at the beginning of said transition region (13) on said wall (12), said temperature sensor (17) fixed in a heat-conducting manner to said cooking pot (10) and covered by attachment portion (22), said attachment (22) facing said wall (12) of said cooking pot (10) having an accommodation means for a connection cable (21) attached to said temperature sensor (17).

12. A cooking utensil according to claim 11, characterized by an NTC-resistor being used as said temperature sensor (17); said resistor exhibiting a generally linear resistance-temperature characteristic curve in the temperature range of about 95° C. to 120° C.

13. A cooking utensil according to claim 11, characterized by a PTC-resistor being used as said temperature sensor (17); said resistor exhibiting a generally linear resistance-temperature characteristic curve in the temperature range of about 95° C. to 120° C.

\* \* \* \* \*